Patented July 16, 1940

2,207,989

UNITED STATES PATENT OFFICE 2,207,989

PURIFICATION OF ALKYL SULPHATES AND RESULTING PRODUCTS

Kenneth E. Long, South Euclid, Ohio, assignor to The Harshaw Chemical Company, Elyria, Ohio, a corporation of Ohio No Drawing. Application August 24, 1938, Serial No. 226,585

5 Claims. (Cl. 260—459)

This invention relates to the purification of alkyl sulphates for use as anti-pitting agents in acid nickel plating.

Technical sodium lauryl sulphate (sold under the trade-names, Duponol, Gardinol, Dreft, etc.) is an article of commerce and has been used for several years as an anti-pitting agent in aqueous, acid nickel plating solutions. It is a sulphation product of a fraction of a fatty alcohol material derived from coconut oil and contains sodium lauryl sulphate and higher and lower fatty alcohol sulphates between 8 and 18 carbon atoms as well as small quantities of free fatty alcohols and organic impurities.

Some of the constituents of this material, the nature of which I do not know with certainty, but which appear as suspensoid or emulsoid impurities, are considered detrimental to the resulting nickel plate, particularly in respect to salt spray resistance. This has been known for some time and workers in the art have attempted, but without success, to provide a practical method of removing the objectionable constituents.

I have discovered that if an aqueous solution of technical sodium lauryl sulphate, or the like material, is treated with boric acid and then cooled to a temperature low enough to produce a boric acid precipitate, the undesirable constituents of the alcohol sulphate material separate out with the precipitate and are thus easily removed, leaving a clear solution.

I find it desirable also to pretreat the sodium lauryl sulphate material with a suitable nickel salt, such as the sulphate or the chloride. I prefer to add boric acid to the point of substantial saturation at an elevated temperature and then reduce the temperature whereby the boric acid is precipitated, forming in the solution a precipitate which either by chemical combination, adsorption, or otherwise carries down the undesirable constituents of the original material.

I can, for example, use a 1% to 10%, desirably a 5%, solution of sodium lauryl sulphate and treat the same with from 25 to 100 grams per liter of boric acid. The temperature at which the boric acid is added should be well below the boiling point of the solution, suitably 70° to 100° F. and the lowest temperature to which the solution is reduced by refrigeration may be approximately the freezing point of the solution, desirably 40° to 60° F. Preferably the boric acid is added to substantial saturation at about 70° to 100° F. and the solution is then refrigerated to 40° to 60° F. and filtered cold. The filtrate is the desired product and I have found it to be highly satisfactory for use as an anti-pitting agent in the Watt's type acid nickel plating bath. I have also found it to be compatible with other addition agents commonly used in the Watt's bath for production of brightness, such as aromatic sulphonates, selenious acid, zinc, etc.

Example I

A 5% aqueous solution of a technical sodium lauryl sulphate material, sold under the trade-name Duponol M. E. Dry, at a temperature of 100° F., was treated with 60 grams per liter of $H_3BO_3$. The solution was cooled to 60° F. and filtered cold.

Example II

A 5% aqueous solution of Duponol M. E. Dry was treated with 8 ounces per gallon of

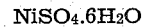

$NiSO_4.6H_2O$ and filtered through activated charcoal. To the filtrate, at 70° F., was added 50 grams per liter of $H_3BO_3$. The solution was cooled to 50° F. and filtered cold.

Example III

A 5% aqueous solution of Duponol M. E. Dry, at a temperature of 70° F., was treated with 25 grams per liter of $H_3BO_3$. The solution was cooled to 40° F. and filtered cold.

Having thus described my invention, what I claim is:

1. Process of conditioning a technical material composed principally of sodium alkyl sulphates having from 8 to 18 carbon atoms in the molecule for use as an anti-pitting agent in acid nickel plating, comprising dissolving boric acid in an aqueous solution thereof, cooling the solution sufficiently to produce a precipitate, and removing the precipitate.

2. Process of conditioning a technical material composed principally of sodium alkyl sulphates having from 8 to 18 carbon atoms in the molecule for use as an anti-pitting agent for acid nickel plating which comprises adding boric acid to an aqueous solution thereof to substantial saturation, refrigerating the resulting solution to produce a precipitate and removing the precipitate.

3. Process of conditioning a technical material composed principally of sodium alkyl sulphates having from 8 to 18 carbon atoms in the molecule for use as an anti-pitting agent in acid nickel plating, comprising providing an aqueous solution of said material of a concentration from 1% to 10% at a temperature not substantially below normal room temperature, adding boric acid and refrigerating the solution to a temperature sufficiently low to cause boric acid to crystallize out.

4. Process of conditioning a technical material composed principally of sodium alkyl sulphates having from 8 to 18 carbon atoms in the molecule for use as an anti-pitting agent in acid nickel plating, comprising providing an aqueous solution of said material of a concentration from 1% to 10% at a temperature not substantially below normal room temperature, adding boric acid and refrigerating the solution to a temperature sufficiently low to cause boric acid to crystallize out, and not higher than 50° F.

5. As a new composition of matter an aqueous solution suitable for use in an acid nickel plating bath, free from suspended material and capable of enhancing the salt spray resistance of nickel deposits as compared to technical sodium lauryl sulphate, containing such components of technical sodium lauryl sulphate as remain when a 1% to 10% aqueous solution thereof is treated with from 25 to 100 grams per liter of boric acid at a temperature of from 70° F. to 100° F. and then cooled to a temperature of from 40° F. to 60° F. and filtered, said solution also containing boric acid at least to the extent that the same is soluble in said solution at 40° F.

KENNETH E. LONG.